US010045164B2

(12) United States Patent
Lin

(10) Patent No.: US 10,045,164 B2
(45) Date of Patent: Aug. 7, 2018

(54) METHOD OF SINGLE-CELL POINT-TO-MULTIPOINT TRANSMISSION

(71) Applicant: ACER INCORPORATED, New Taipei (TW)

(72) Inventor: Jung-Mao Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/665,409

(22) Filed: Jul. 31, 2017

(65) Prior Publication Data

US 2017/0332215 A1 Nov. 16, 2017

Related U.S. Application Data

(63) Continuation of application No. 15/005,027, filed on Jan. 25, 2016, now Pat. No. 9,756,483.

(60) Provisional application No. 62/109,061, filed on Jan. 29, 2015.

(51) Int. Cl.
*H04W 24/00* (2009.01)
*H04W 4/08* (2009.01)
*H04L 12/58* (2006.01)
*H04W 72/00* (2009.01)
*H04L 12/18* (2006.01)
*H04W 8/22* (2009.01)
*H04W 4/06* (2009.01)

(52) U.S. Cl.
CPC ............ *H04W 4/08* (2013.01); *H04L 12/189* (2013.01); *H04L 51/38* (2013.01); *H04W 4/06* (2013.01); *H04W 8/22* (2013.01); *H04W 72/005* (2013.01)

(58) Field of Classification Search
CPC ....... H04W 4/08; H04W 8/22; H04W 72/005; H04W 4/06; H04L 12/189
USPC ...................................................... 455/456.3
See application file for complete search history.

(56) References Cited

U.S. PATENT DOCUMENTS

| 2004/0157640 | A1  | 8/2004  | Pirskanen |
|---|---|---|---|
| 2009/0131063 | A1  | 5/2009  | Yi |
| 2010/0254352 | A1* | 10/2010 | Wang .................. H04W 72/005 370/332 |
| 2010/0278093 | A1* | 11/2010 | Wang .................... H04L 1/0025 370/312 |
| 2010/0309836 | A1* | 12/2010 | Sugawara ......... H04W 72/1231 370/312 |

(Continued)

FOREIGN PATENT DOCUMENTS

| EP | 2 605 550 A1 | 6/2013 |
|---|---|---|
| WO | 2008131523 A1 | 11/2008 |

(Continued)

*Primary Examiner* — Amancio Gonzalez
(74) *Attorney, Agent, or Firm* — Winston Hsu

(57) ABSTRACT

A method of single-cell point-to-multipoint (SCPTM) transmission for a mobile device in a wireless communication system is disclosed. The method comprises monitoring a message including mapping information between at least a temporary mobile group identity (TMGI) and at least a group radio network temporary identify (G-RNTI), determining whether a SCPTM service is started or activated according to whether one of the at least a TMGI corresponding to the SCPTM service is mapped to a G-RNTI, and performing a query procedure to start or turn on data transmission for the SCPTM service when the SCPTM service is not started or not activated.

11 Claims, 17 Drawing Sheets

(56) References Cited

U.S. PATENT DOCUMENTS

| | | | | |
|---|---|---|---|---|
| 2011/0019648 A1* | 1/2011 | Huang | ............... | H04W 72/005 |
| | | | | 370/332 |
| 2012/0182921 A1* | 7/2012 | Tsuboi | ................. | H04W 4/021 |
| | | | | 370/312 |
| 2012/0294269 A1* | 11/2012 | Yamada | ............... | H04L 1/1864 |
| | | | | 370/329 |
| 2012/0294270 A1* | 11/2012 | Yamada | ............... | H04W 74/02 |
| | | | | 370/329 |
| 2012/0307767 A1* | 12/2012 | Yamada | ............... | H04W 74/02 |
| | | | | 370/329 |
| 2014/0286222 A1 | 9/2014 | Yu | | |

FOREIGN PATENT DOCUMENTS

| | | |
|---|---|---|
| WO | 2009022836 A2 | 2/2009 |
| WO | 2009045006 A1 | 4/2009 |
| WO | 2010003318 A1 | 1/2010 |

\* cited by examiner

SCPTM service list :
TMGI #1→G-RNTI #a
TMGI #2→G-RNTI #b
TMGI #3→G-RNTI #c
TMGI #4→
TMGI #5→

FIG. 13

METHOD OF SINGLE-CELL POINT-TO-MULTIPOINT TRANSMISSION

CROSS REFERENCE TO RELATED APPLICATIONS

This application is a continuation of U.S. application Ser. No. 15/005,027 filed on Jan. 25, 2016 which claims the benefit of provisional Application No. 62/109,061 filed on Jan. 29, 2015.

BACKGROUND OF THE INVENTION

1. Field of the Invention

The present invention relates to a method used in a communication device in a wireless communication system, and more particularly, to a method of single-cell point-to-multipoint transmission.

2. Description of the Prior Art

3GPP in Release 12 proposes single-cell point-to-multipoint (SCPTM) service to reuse the Multimedia Broadcast Multicast Service (MBMS) structure for critical communications, such as public safety applications and general commercial applications (e.g., utility companies and railways). Note that, SCPTM service aims at providing MBMS session established on a single cell for critical communications, which is different to original MBMS design for the provision of media content in a large per-planned area (i.e. MBSFN area), where MBMS session is established on a plurality of cells.

Please refer to FIG. 1, which illustrates a schematic diagram for mapping between TMGI and G-RNTI for a SCPTM service. A user equipment (UE) could perform SCPTM reception either in idle mode or in connected mode. The UE knows a Temporary Mobile Group Identity (TMGI) for the group of interest via User Service Guide (USG). The TMGI is used to identify a SCPTM service. The eNB provides the mapping between G-RNTI and TMGI by single cell-multicast control channel (SC-MCCH). When the eNB provides the TMGI and G-RNTI mapping by SC-MCCH, the UE interesting SCPTM service could monitor the SC-MCCH to find the desired SCPTM service's TMGI and the corresponding G-RNTI mapping. Once the UE finds the desired SCPTM service's corresponding G-RNTI mapping, the UE could get the desired SCPTM service's resource information by monitoring Physical Downlink Control Channel (PDCCH) associate with the corresponding G-RNTI. Then, the UE could get the desired SCPTM service from. Physical Downlink Shared Channel (PDSCH).

In addition, please refer to FIG. 2, which illustrates a schematic diagram of a MBMS session life cycle for a SCPTM service according to the prior art. In FIG. 2, a MBMS session life cycle includes "service announcement", "session start", "MBMS notification", "data transfer" and "session stop". In a word, when a MBMS session for a SCPTM service is started, the MBMS session will start the data transfer until the session stop. However, this will reduce the radio efficiency over SCPTM service because a cell has to continue data transmission of the MBMS session for the SCPTM service even there are no interested UE in its coverage.

SUMMARY OF THE INVENTION

It is therefore an objective to provide a method of SCPTM data transmission to solve the above problem.

The present invention discloses a method of single-cell point-to-multipoint (SCPTM) transmission for a mobile device in a wireless communication system. The method comprises monitoring a message including mapping information between at least a temporary mobile group identity (TMGI) and at least a group radio network temporary identity (G-RNTI), determining whether a SCPTM service is started or activated according to whether one of the at least a TMGI corresponding to the SCPTM service is mapped to a G-RNTI, and performing a query procedure to start data transmission for the SCPTM service when the SCPTM service is not started or activated.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 13 is a schematic diagram of a SC-MCCH message.

DETAILED DESCRIPTION

Figure 3:
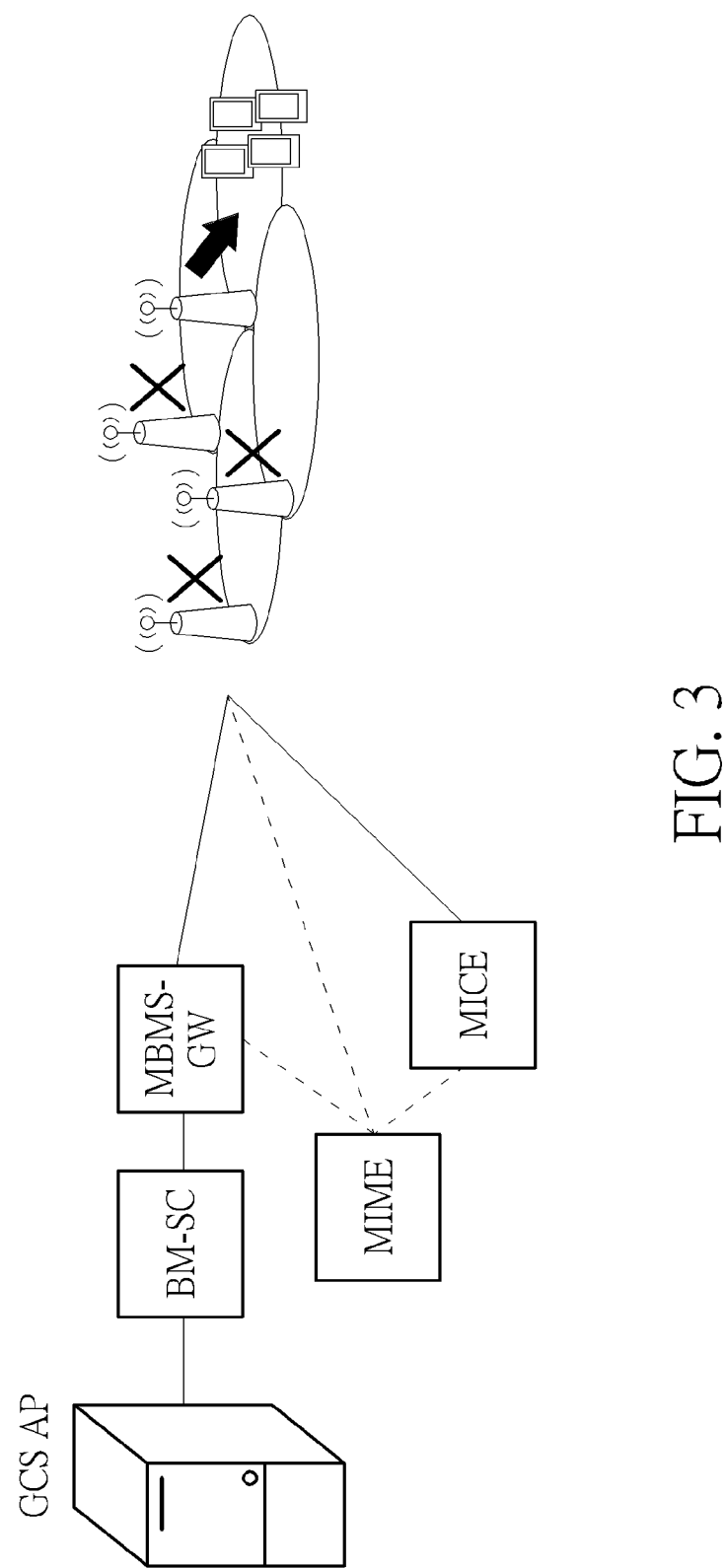
FIG. 3 is a schematic diagram of a wireless communication system.

Please refer to FIG. 3, which is a schematic diagram of a wireless communication system. The wireless communication system is a LTE system or other mobile communication systems, and is composed of a group communication service application server (GCS AP), Broadcast-Multicast Service Centre (BM-SC), MBMS Gateway (MBMS-GW), Mobility Management Entity (MME), MBMS coordination entity (MCE), eNBs and user equipments (UEs). Note that, the GCS AP is responsible for providing data to multiple UEs at the same time by MBMS transmission or single-cell point-to-multipoint (SCPTM) transmission. The BM-SC is used for MBMS control, such as MBMS service announcement and MBMS session start. The MBMS GW is used for establishment of MBMS session with eNB by MME. In addition, the MCE aims at choose between MBMS and SCPTM transmission.

Figure 4:
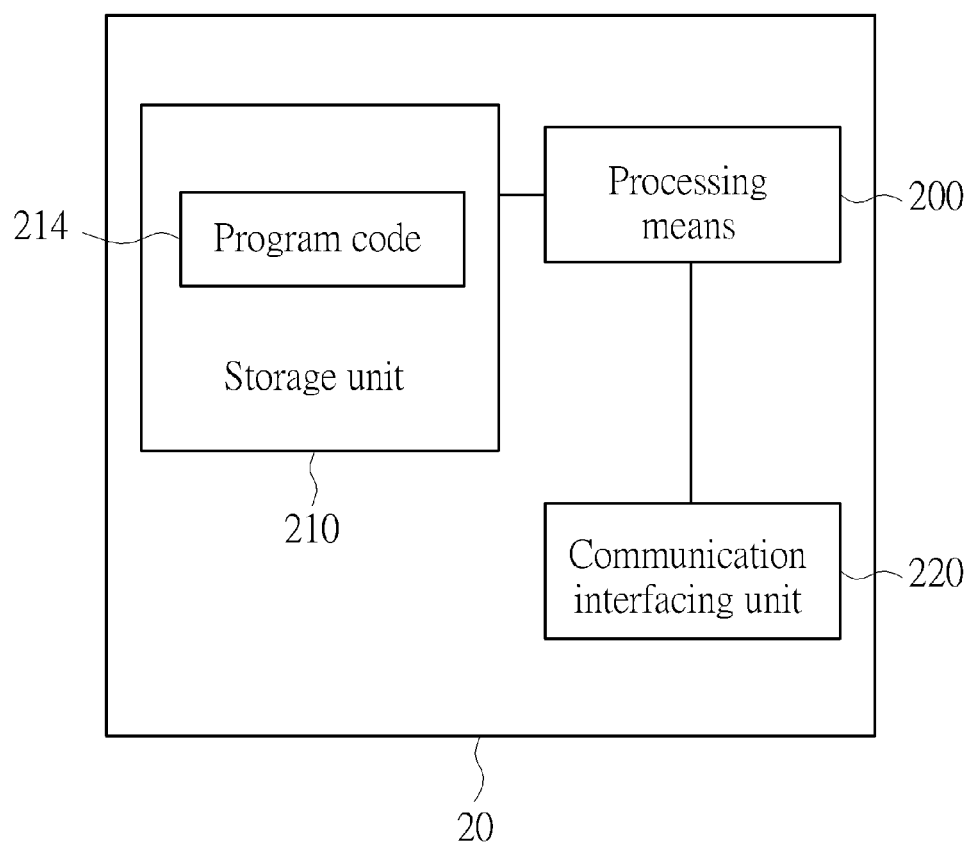
FIG. 4 is a schematic diagram of an exemplary communication device.

FIG. 4 is a schematic diagram of an exemplary communication device 40. The communication device 40 can be the UE or eNB shown in FIG. 3. The communication device 40 may include a processing means 400 such as a microprocessor or Application Specific Integrated Circuit (ASIC), a storage unit 410 and a communication interfacing unit 420. The storage unit 410 may be any data storage device that can store program code 414, for access by the processing means 400. Examples of the storage unit 410 include but are not limited to a subscriber identity module (SIM), read-only memory (ROM), flash memory, random-access memory (RAM), CD-ROMs, magnetic tape, hard disk, and optical data storage device. The communication interfacing unit 420 is preferably a radio transceiver and can exchange wireless signals with a network node (i.e. an eNB) or a communication device (i.e. an UE) according to processing results of the processing means 400.

Figure 5:
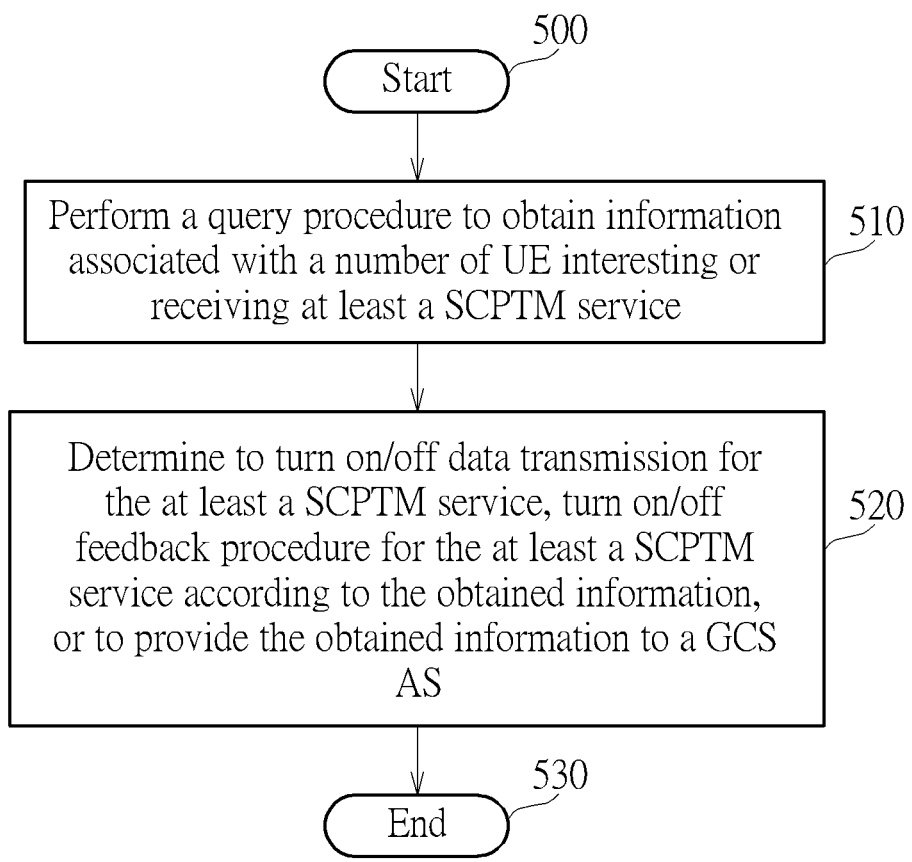
FIG. 5 is a flowchart of an exemplary process according to the present disclosure.

Please refer to FIG. 5, which is a flowchart of a process 50 according to an example of the present disclosure. The process 50 is utilized in the eNB of FIG. 3 for SCPTM transmission. The process 50 may be compiled into a program code 414 to be stored in the storage unit 410, and may include the following steps:

Step 500: Start.

Step 510: Perform a query procedure to obtain information associated with a number of UE interesting or receiving at least a SCPTM service.

Step 520: Determine to turn on/off data transmission for the at least a SCPTM service, turn on/off feedback procedure for the at least a SCPTM service according to the obtained information, or to provide the obtained information to a GCS AS.

Step 530: End.

According to the process 50, the eNB performs the query procedure to investigate how many interested UE or how many UE receives the SCPTM service. As a result, the eNB can dynamically control (e.g. turn off or turn on) the data transmission for the SCPTM service or the feedback mechanism for the SCPTM service. Or, the eNB can bring the investigation to the GCS AS to determine whether to use the MBMS transmission for the SCPTM service. With such manner, radio efficiency is improved in the SCPTM service.

In addition, the present invention proposes new statuses for the SCPTM service. A SCPTM service is called un-activated SCPTM service when a MBMS session for the SCPTM service is started but its data transmission is turned off by a cell. The SCPTM service is called activated SCPTM service when a MBMS session for the SCPTM service is started and its data transmission is turned on by a cell.

In detail, by querying interested UE number or receiving SCTPM service UE number, the eNB decides whether to turn off the data transmission for an activated SCPTM service. For example, the eNB may decides to turn off the data transmission for an activated SCPTM service if the number of interested UE or the number of receiving SCPTM service UE is below a threshold (ex:4). Otherwise, the eNB continues the data transmission for the activated SCPTM service. Moreover, the eNB may report related information to the GCS AS. For example, if there is no receiving SCPTM service UE, the eNB may inform this information (i.e. interested UE number or the receiving SCPTM service UE number) to GCS AS or if the number of receiving SCPTM service UE is below a threshold. Besides, the eNB could also decide whether turn on the feedback procedure. For example, the eNB may decides to turn on the feedback procedure for a SCPTM service if the number of interested UE or the number of receiving SCPTM service UE is below a threshold. Once the feedback mechanism turns on, the UE could feedback the SCPTM data receiving status to help eNB to decide better transmission method (e.g., better modulation and coding set).

Figure 1:
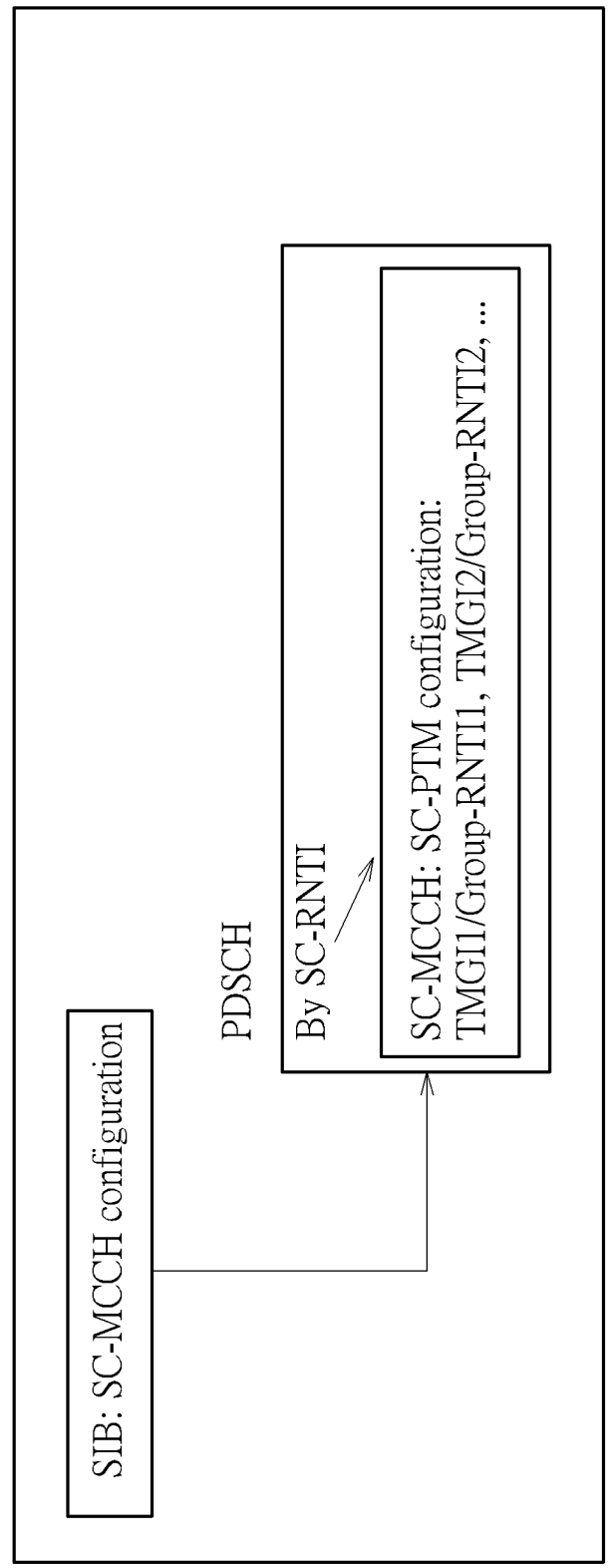
FIG. 1 is a schematic diagram for TMGI and G-RNTI mapping according to the prior art.
Figure 2:
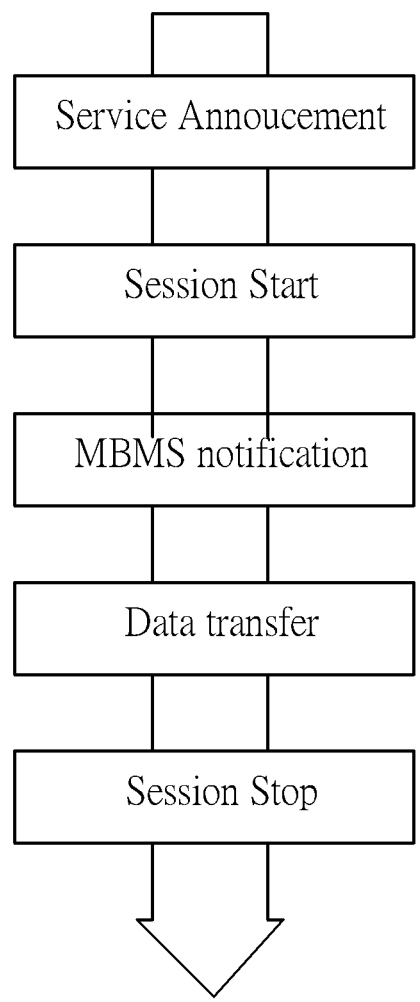
FIG. 2 is a schematic diagram of a MBMS session life cycle according to the prior art.
Figure 6:
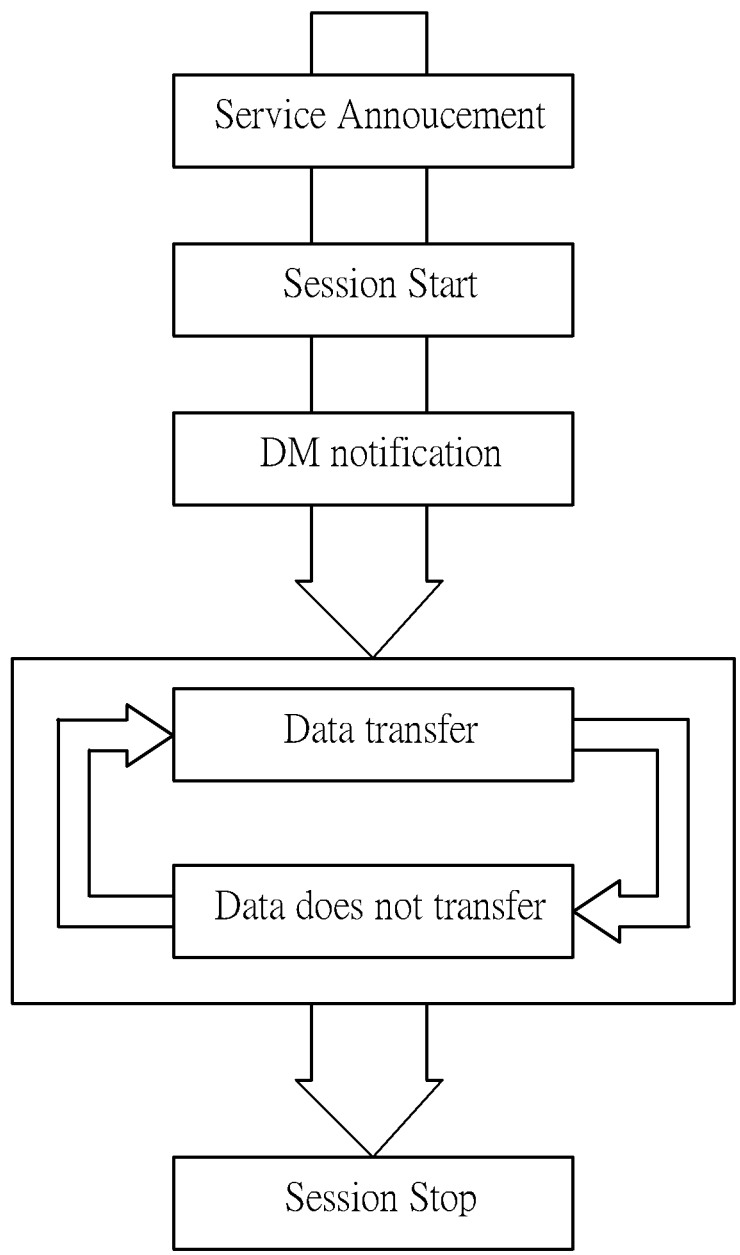
FIG. 6 is a schematic diagram of a life cycle of a MBMS session for the SCPTM transmission according to the present disclosure.

Please refer to FIG. 6, which illustrates a life cycle of a MBMS session for the SCPTM transmission. Compared to the MBMS session life cycle shown in FIG. 2, the MBMS session life cycle shown in FIG. 6 further includes a step of "data does not transfer", namely data transmission of the MBMS session for the SCPTM service can be turned off and turned on by the eNB according to the number of UE interesting or receiving the SCPTM service, which is obtained via the query procedure.

The present invention proposes several alternative methods for querying interested UE number or receiving SCTPM service UE number. In an embodiment, if an eNB wants to query the interested UE number for an activated SCPTM service, it could just provide un-activated SCPTM service information to UEs in the serving area. In detail, the eNB stops allocating or mapping the G-RNTI for the target activated SCPTM service in SC-MCCH of a cell. However, the eNB still uses the G-RNTI in PDCCH to indicate the SCPTM service in PDSCH in order not to affect the activated SCPTM service operation. If any UE is interested to the target activated SCPTM service, it will follow a UE query procedure to send the query indication. In this way, the eNB could investigate whether the UE is interested in an activated SCPTM service in a cell. Detailed operation for the UE query procedure is described in this article later on.

Figure 7:
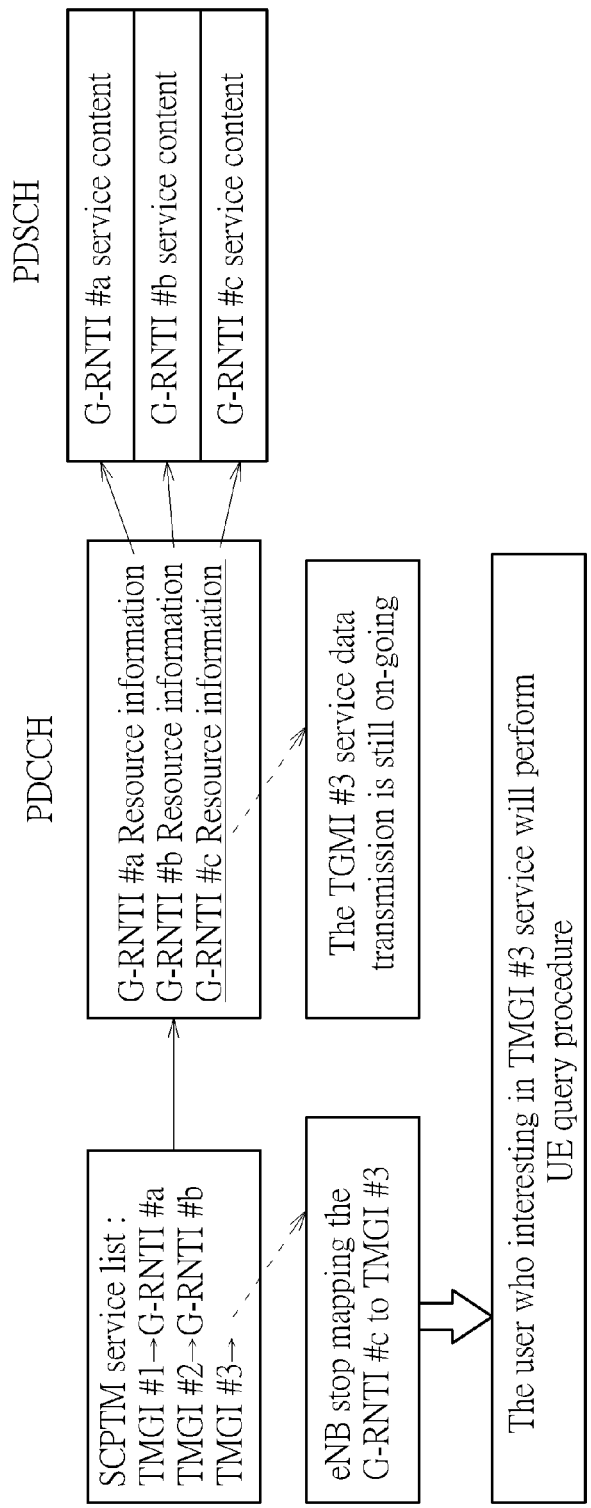
FIGS. 7-10 are schematic diagrams of an eNB query procedure.

Please refer to FIG. 7, which illustrates an example for querying UE number interesting in an activated SCPTM service. In this example, if an eNB wants to investigate that is any UE interested to the activated SCPTM service with TMGI#3, it will stop allocating or mapping G-RNTI#c to TMGI#3 in SC-MCCH . As a result, the UE considers the SCPTM service corresponding to TMGI#3 is an un-activated SCPTM service. Then, if any UE is interested to the SCPTM service corresponding to TMGI#3, it will perform the UE query procedure to turn on data transmission for the SCPTM service. However, in order not to affect the activated SCPTM service (namely not to affect the current receiving SCPTM service users) , the eNB still allocates the G-RNTI#c in PDSCH to indicate the SCTPM service in PDSCH.

Figure 8:
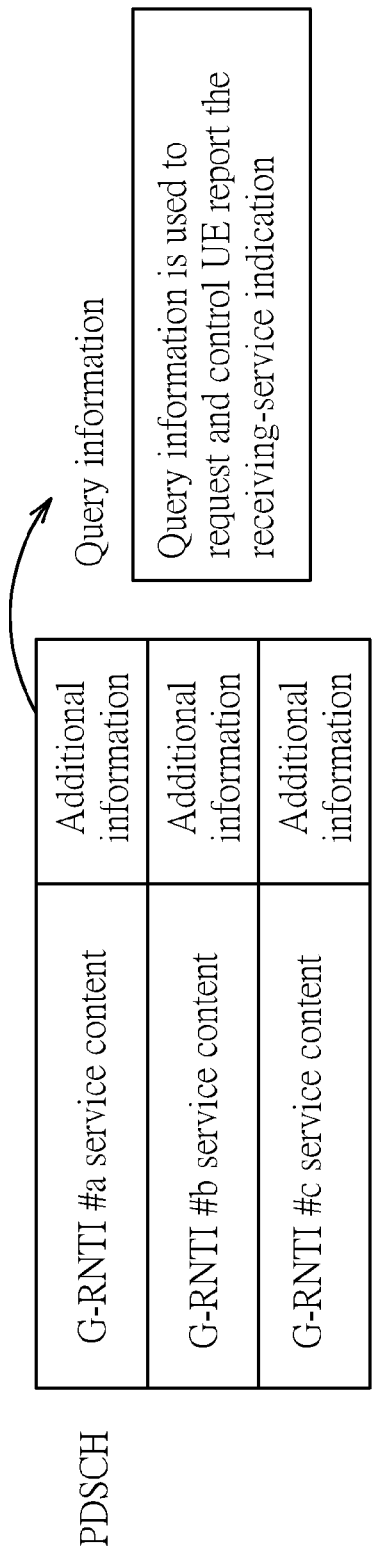

On the other hand, if an eNB wants to query the UE number receiving a SCPTM service, the eNB sends a query message to the UE. Please refer to FIG. 8, which illustrates a first example of the query message. In FIG. 8, the eNB carries query information in additional information in PDSCH for each SCPTM service. The query information is used to request and control the UE to report a receiving-service indication. By reception of the receiving-service indications from the UEs, the eNB could obtain the information of receiving SCPTM service UE number. The receiving-service indication may include information of the corresponding TMGI and a cell identity for the SCPTM service.

For receiving-service indication reporting, a connected mode UE may use a UL resource requested by normal resource request procedure to send the receiving-service indication. On the other hand, an idle mode UE may use a UL resource requested by random access (RA) procedure to send the receiving-service indication. For example, the UE could perform the RA at the original PRACH (Physical Random Access Channel) resource or at a specific resource indicated by the query information in the additional information. The specific resource could be a dedicated resource used for RA procedure. In addition, the idle mode UE could also use the RRCConnectionRequest message to carry the receiving-service indication and return to idle mode after sending the receiving-service indication.

Figure 9:
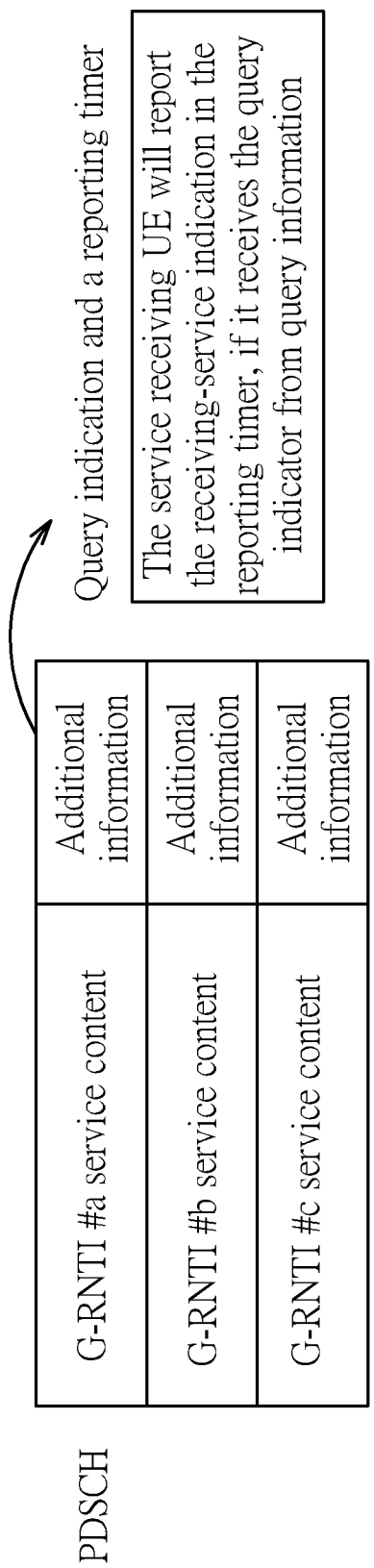

In other embodiments, please refer to FIG. 9, which illustrates a second example of the query message. The eNB uses a request indication and a reporting timer in the query information to request and control a UE to report the receiving-service indication. If the UE receives the request indication and the reporting timer from the query information of its receiving SCPTM service, it may report the receiving-service indication to the eNB during the reporting time.

Therefore, the eNB could decide whether any UE receives the SCPTM service or the roughly number of UE receives the SCPTM service by the number of receiving-service indication.

Figure 10:
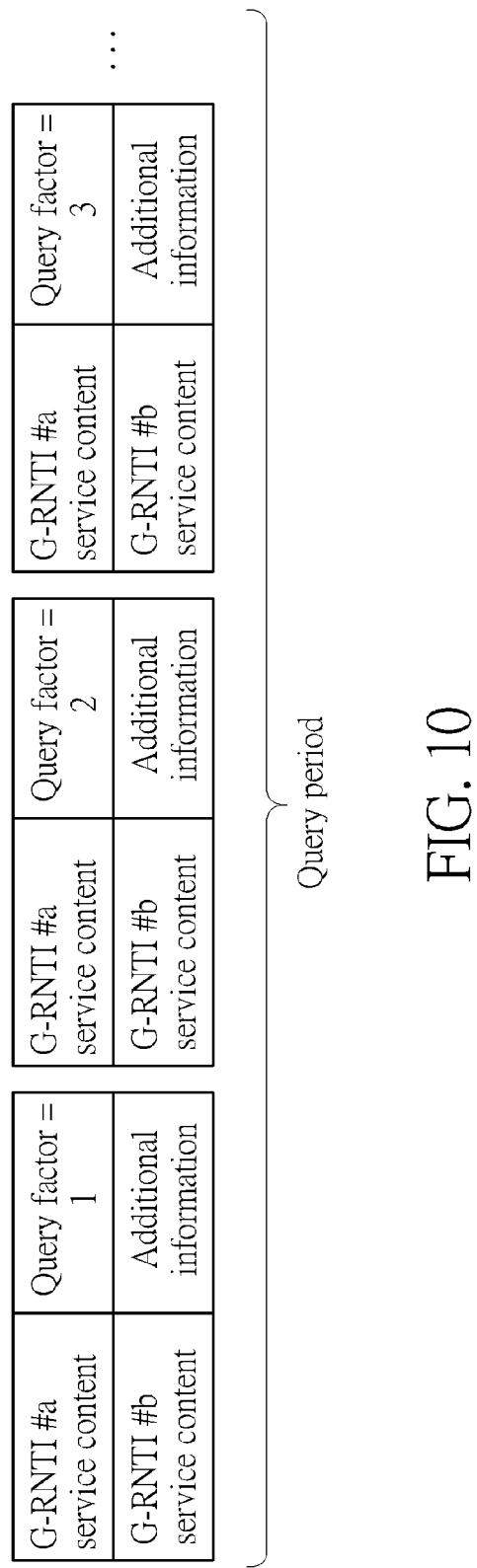

In addition, there may be lots of receiving SCPTM service UEs report the receiving-service indications during the reporting time. This may cause resource congestion for reporting the receiving-service indications. Please refer to FIG. 10, which illustrates a third example of the query message. In FIG. 10, the eNB could use the query factor in query information to request and control the receiving-service indication reporting. Once a UE receives the query factor from the query information of its receiving SCPTM service, the UE will report the receiving-service indication if it satisfies the reporting condition. Besides, in order to distribute UE reporting the receiving-service indication, the eNB uses the query factor to control the reporting condition. The query factor could be a real number between 1 and 10. The query factor may be continually appeared in query information. The duration of query information which continues carrying the query factor is called query period.

Detailed operation for the query factor is described as following. With query factor in query information, if the eNB want to know is there any UE receiving the SCPTM service in a cell or eNB wants to know whether the number of UE receiving the SCPTM service exceed the threshold. The eNB could control the query period to reduce the un-necessary reporting. For example, once eNB receives the receiving-service indication exceed the threshold, the eNB stop the query period by stopping carrying the query factor in additional information. In this way, other receiving SCPTM service UE will not report the receiving-service indication.

In addition, with query factor, the eNB could also distribute/concentrate the reporting number based on the current resource loading. For example, if the cell loading is heavy, eNB could assign the query factor to be 1, 2, 3 . . . and 10 respectively in the additional information to distribute the reporting number. If the cell loading is light, eNB could assign the query factor to be 5 and 10 respectively in the additional information to concentrate the reporting number.

Figure 11:
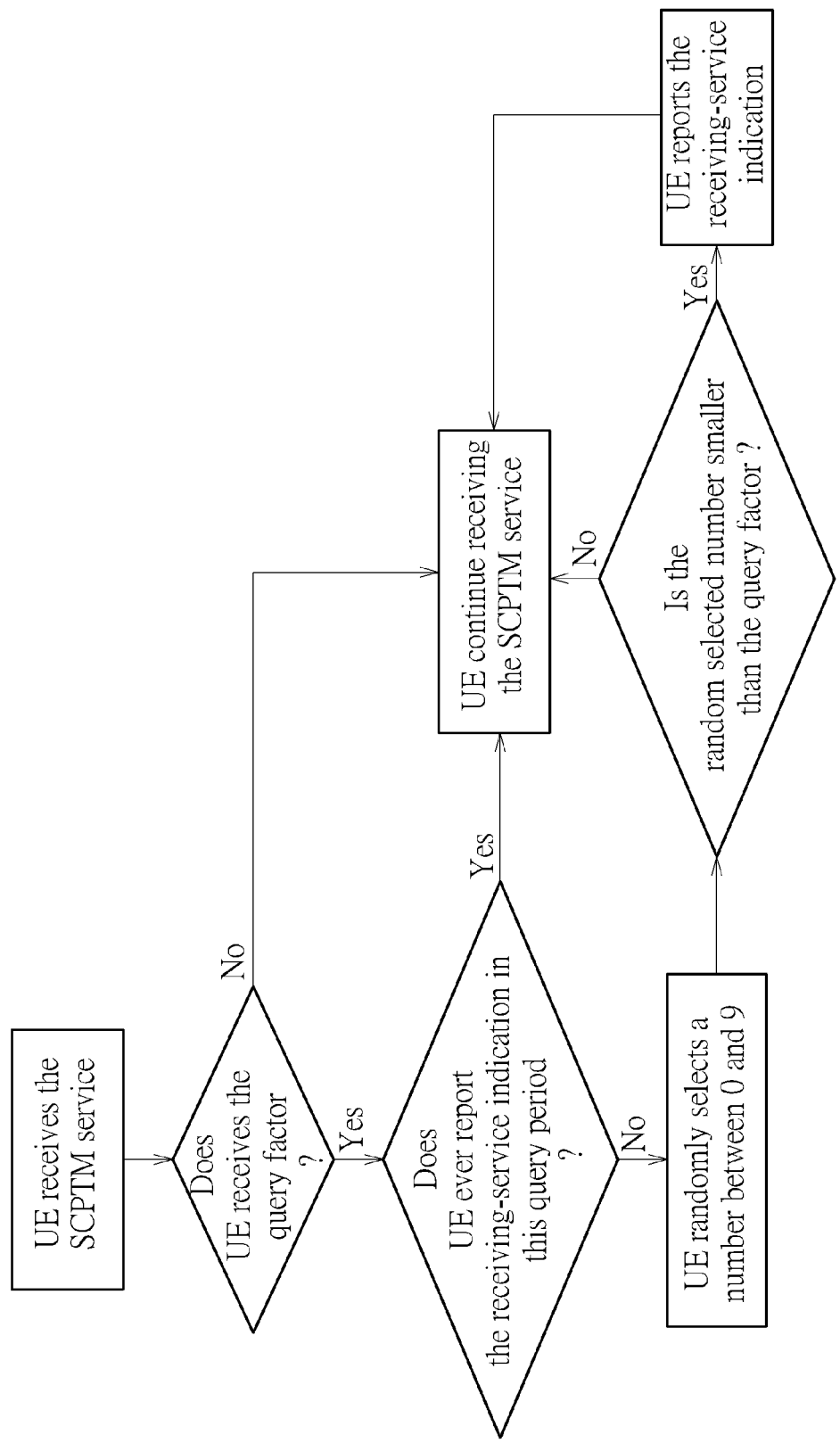
FIG. 11 is a schematic diagram of UE behavior in an eNB query procedure.

Please refer to FIG. 11, which illustrates a UE behavior in the eNB query procedure. In each query period, the UE will only report the receiving-service indication once. When UE receives the query factor from query information in the receiving SCPTM service, the UE may random select a number between 0 and 9 if the UE does not report the receiving-service indication in this query period. If the random selected number is smaller than the query factor, it will report the receiving-service indication. Otherwise, the UE continues receiving the SCPTM service and not report the receiving-service indication.

Figure 12:
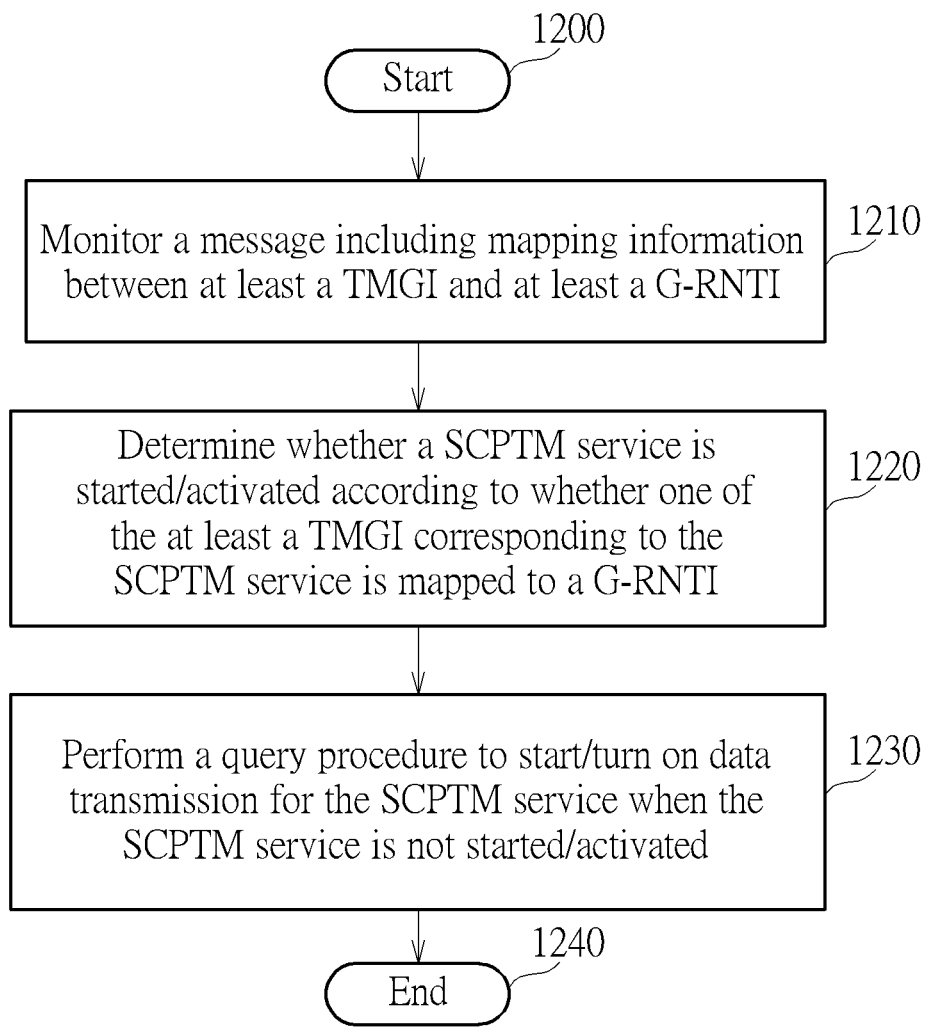
FIG. 12 is a flowchart of an exemplary process according to the present disclosure.

Please refer to FIG. 12, which is a flowchart of a process 120 according to an example of the present disclosure. The process 120 is utilized in the UE of FIG. 3 for SCPTM transmission. The process 120 may be compiled into a program code 414 to be stored in the storage unit 410, and may include the following steps:

Step 1200: Start.

Step 1210: Monitor a message including mapping information between at least a TMGI and at least a G-RNTI.

Step 1220: Determine whether a SCPTM service is started/activated according to whether one of the at least a TMGI corresponding to the SCPTM service is mapped to a G-RNTI.

Step 1230: Perform a query procedure to start/turn on data transmission for the SCPTM service when the SCPTM service is not started/activated.

Step 1240: End.

According to process 120, the UE could use query procedure to remind the eNB to turn on the data transmission for the desired SCPTM service.

In addition, in the UE query procedure, the UE could use a query indication to remind eNB to turn on the data transmission for the desired un-activated SCPTM service. The query indication may carry the TMGI for the desired un-activated SCPTM service and it may also include the desired un-activated SCPTM service's cell identity in carrier aggregation (CA) scenarios. As a result, the query indication could let the eNB realize which un-activated SCPTM service is desired.

A connected mode UE could use normal UL resource request procedure to request UL resource to send the query indication. An idle mode UE could use random access (RA) procedure to request UL resource to send the query indication. The idle mode UE could use the RRCConnectionRequest message to carry the query indication. After sending query indication, the UE could continue monitoring a SC-MCCH message for TMGI and G-RNTI mapping information. On the other hand, the eNB could decide whether turn on/off data transmission for a SCPTM service based on the received query indication number. For example, eNB may decide to turn on the data transmission for an un-activated SCPTM service, if eNB receives the number of query indication is bigger than a threshold (ex: 4).

In an embodiment, a cell provides the un-activated SCPTM service information to a UE. Please refer to FIG. 13, which illustrates an example for a SC-MCCH message. The SC-MCCH message includes a SCPTM service list carrying mapping information between TMGI and G-RNTI . As shown in FIG. 13, the SCPTM services associate with TMGI #1-#3 mapped to G-RNTI #a-#c are considered as activated SCPTM services, but the SCPTM services associate with TMGI #4 and #5 mapped to no G-RNTI are considered as un-activated SCPTM services. In a word, an un-activated SCPTM service does not have a G-RNTI mapping to a TMGI in the SCPTM service list. In other words, based on the SC-MCCH message, the UE could understand whether data transmission for a SCPTM service is started or not . Detailed operation for the UE query procedure is described as following.

Figure 14:
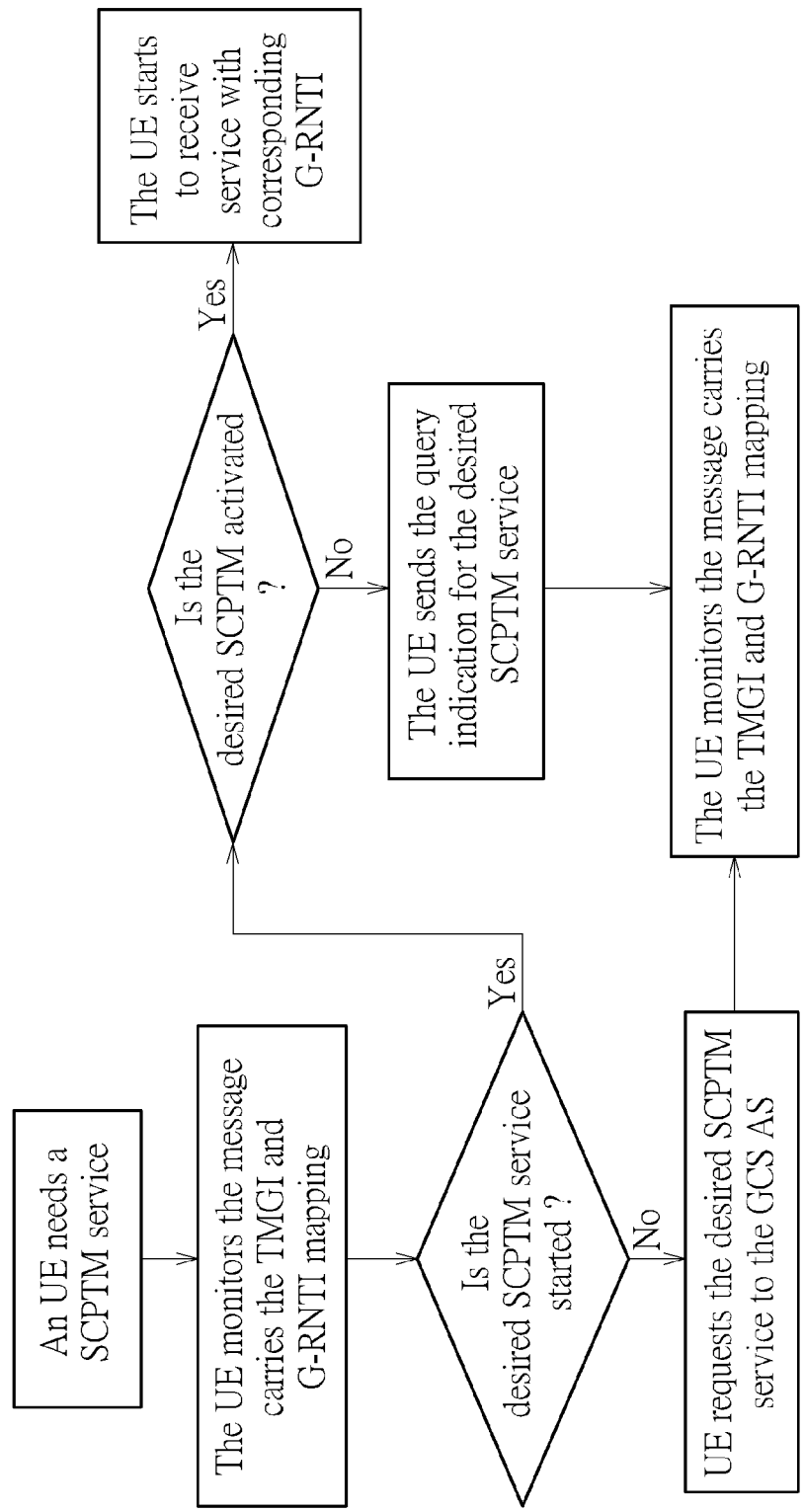
FIGS. 14-15 are schematic diagrams of an UE query procedure.

Please refer to FIG. 14, which illustrates a flow chart of a UE query procedure with the un-activated SCPTM service information. When an UE needs a SCPTM service, the UE could monitor the SC-MCCH message which carries the TMGI and G-RNTI mapping to find whether the desired SCPTM service session is started. If UE find the desired SCPTM service is not started (for example the TMGI #x is not in the SCPTM service list), it will request the GCS AS to start the SCPTM service session and then monitoring the SCPTM service list. If UE find the TMGI #x in the SCPTM service list, it will further verify whether the desired SCPTM service is activated or not by checking the corresponding G-RNTI mapping. If the desired SCPTM service is activated (for example the TMGI #x has a corresponding G-RNTI mapping), the UE will monitor PDCCH by the corresponding G-RNTI. Once the desired SCPTM service isn't activated (for example the TMGI #x doesn't have a corresponding G-RNTI mapping), the UE will send the query indication to eNB for the desired SCPTM service. After sending the query indication, UE will continue monitoring the SCPTM service list.

Figure 15:
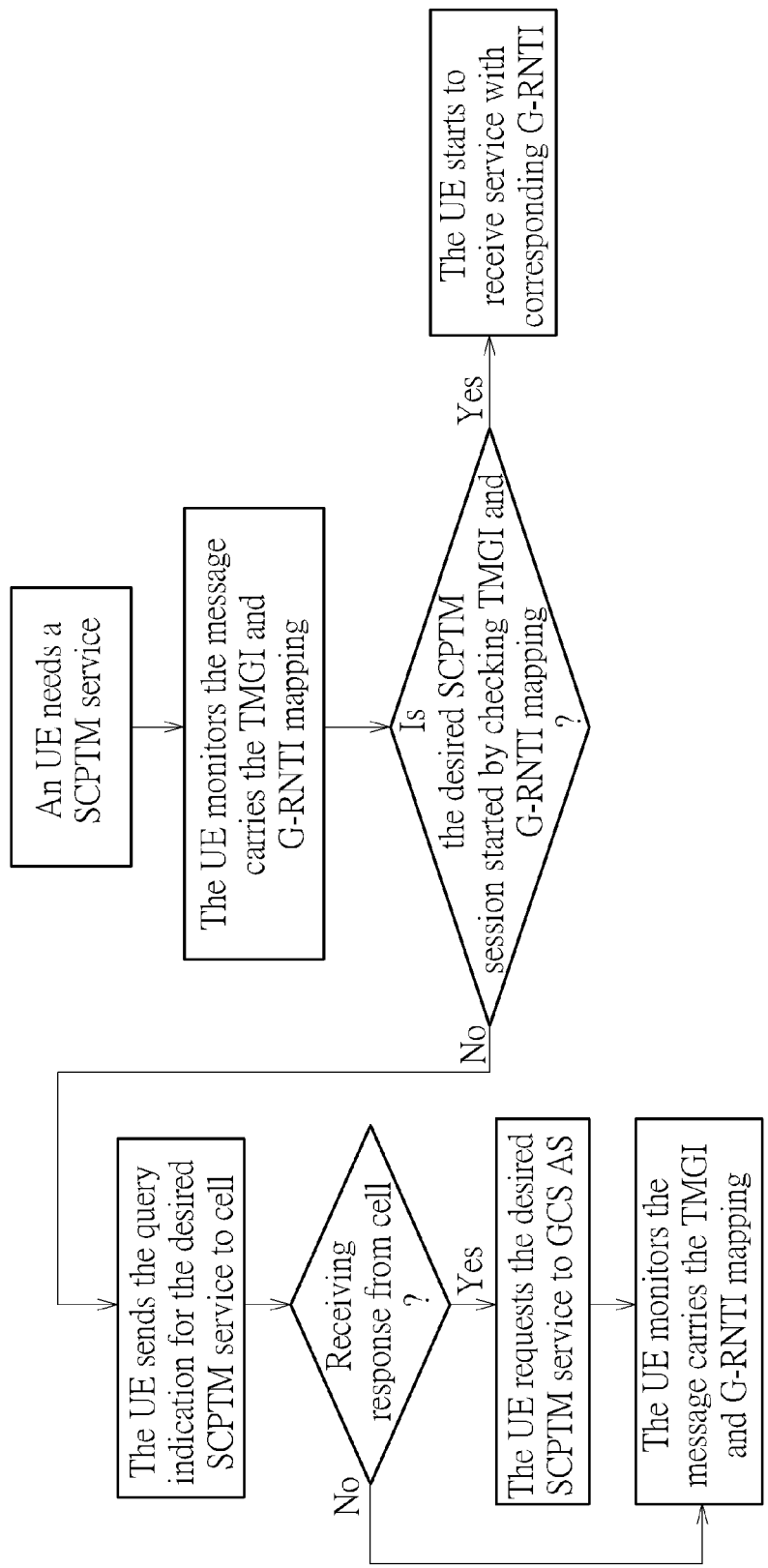

In other embodiments, please refer to FIG. 15, which illustrates a flow chart of a UE query procedure without the un-activated SCPTM service information. In FIG. 15, the UE sends the query indication if UE desired SCPTM service is not in SCPTM service list. After sending the query indication, if UE receives a response message from the eNB, the UE may request the GCS AS to start the desired SCPTM based on the response message. Otherwise, the UE will continue monitoring the SCPTM service list. The response message from the eNB could indicate the reason why cell cannot start the SCPTM data transmission. The reason that eNB cannot start the SCPTM data transmission could be that the SCPTM service is not started by the GCS AS yet or the cell cannot request GCS AS to start the SCPTM service.

Figure 16:
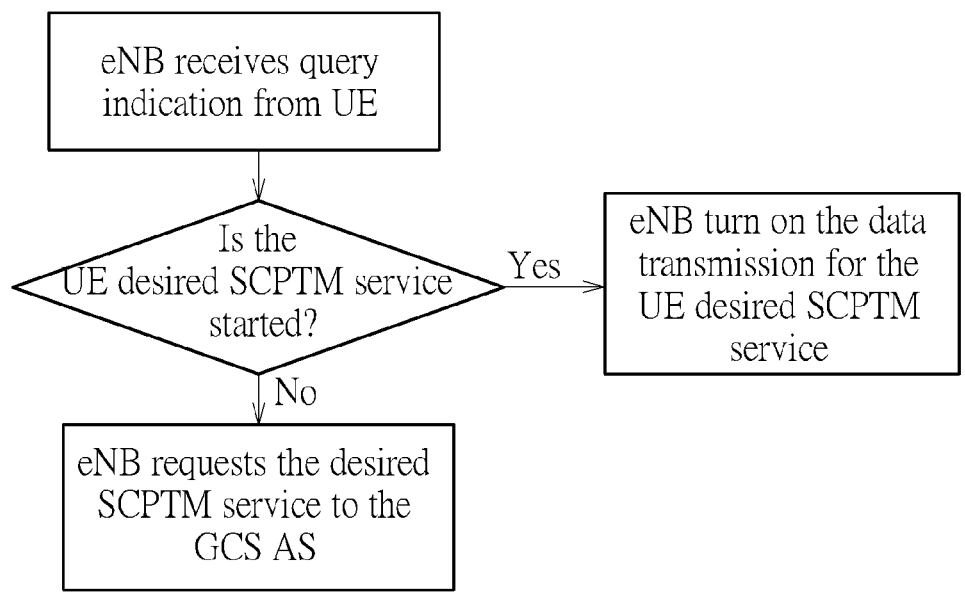
FIGS. 16-17 are schematic diagrams of eNB behavior in an UE query procedure.
Figure 17:
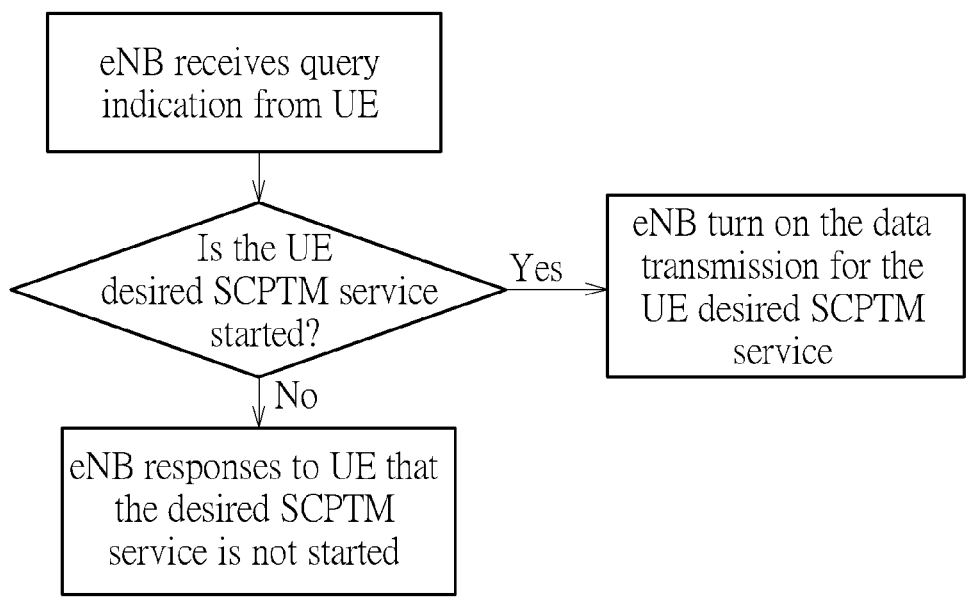

Please refer to FIG. 16-17 for eNB behavior in the UE query procedure. As shown in FIG. 16, if the desired SCPTM service is started, the eNB will turn on the data transmission for the desired SCPTM service and provide the corresponding G-RNTI mapping. However, if the desired SCPTM service is not started, the eNB could request GCS AS to start the SCPTM service, the eNB will send the SCPTM service request to GCS AS. On the other hand, as shown in FIG. 17, if the desired SCPTM service is not started, the eNB responses to UE that the desired SCPTM service is not started.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 40.

In conclusion, the present invention provides an eNB query procedure for getting the referencing information to decide how to dynamic control data transmission scheme for a SCPTM service, so as to enhance the dynamic control data transmission scheme for a SCPTM service. In addition, the present provides a UE query procedure to turn on or start a desired or interested SCPTM service (i.e. an un-activated SCPTM service or not started SCPTM service).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of single-cell point-to-multipoint (SCPTM) transmission for a mobile device in a wireless communication system, the method comprising:
    monitoring a message including mapping information between at least a temporary mobile group identity (TMGI) and at least a group radio network temporary identity (G-RNTI);
    determining whether a SCPTM service is started or activated according to whether one of the at least a TMGI corresponding to the SCPTM service is mapped to a G-RNTI; and
    performing a query procedure to start or turn on data transmission for the SCPTM service when the SCPTM service is not started or not activated.

2. The method of claim 1, wherein determining whether the SCPTM service is started or activated according to whether one of the at least a TMGI corresponding to the SCPTM service is mapped to the G-RNTI comprising:
    determining the SCPTM service is started when one of the at least a TMGI corresponding to the SCPTM service is mapped to the G-RNTI; and
    determining the SCPTM service is not activated when one of the at least a TMGI corresponding to the SCPTM service is not mapped to the G-RNTI.

3. The method of claim 2, further comprising:
    determining whether data transmission for the SCPTM service is activated when the SCPTM service is started.

4. The method of claim 3, further comprising:
    performing the query procedure to turn on the data transmission for the SCPTM service when the SCPTM service is started but the data transmission for the SCPTM service is not activated.

5. The method of claim 3, further comprising:
    receiving the data transmission for the SCPTM service with the mapped G-RNTI when the SCPTM service is started and the data transmission of the MBMS session for the SCPTM service is activated.

6. The method of claim 1, wherein performing the query procedure to start the data transmission for the SCPTM service when the SCPTM service is not started comprises:
    sending a query indication to a network of the wireless communication system, wherein the query indication includes the TMGI corresponding to the SCPTM service or a cell identity providing the SCPTM service.

7. The method of claim 4, wherein performing the query procedure to turn on the data transmission for the SCPTM service when the SCPTM is started but the data transmission for the SCPTM service is not activated comprises:
    sending a query indication to a network of the wireless communication system, wherein the query indication includes the TMGI corresponding to the SCPTM service or a cell identity providing the SCPTM service.

8. The method of claim 6, further comprising:
    receiving a response indicating that the SCPTM service is not started, from the network in response to the query indication.

9. The method of claim 1, further comprising:
    receiving data transmission for the SCPTM service with the mapped G-RNTI when the SCPTM service is started.

10. The method of claim 6, wherein sending the query indication to the network comprises:
    sending the query indication with an uplink resource request procedure when the mobile device is in a radio resource control (RRC) connected mode; or
    sending the query indication with a random access procedure to request an uplink resource for the query indication transmission when the mobile device is in a RRC idle mode.

11. The method of claim 7, wherein sending the query indication to the network comprises:
    sending the query indication with an uplink resource request procedure when the mobile device is in a radio resource control (RRC) connected mode; or sending the query indication with a random access procedure to request an uplink resource for the query indication transmission when the mobile device is in a RRC idle mode.

* * * * *